United States Patent
Kim et al.

(10) Patent No.: US 10,488,730 B2
(45) Date of Patent: Nov. 26, 2019

(54) ELECTROCHROMIC DEVICE, METHOD FOR, MANUFACTURING ELECTROCHROMIC DEVICE, AND ELECTROCHROMIC LIGHT CONTROL DEVICE

(71) Applicants: Sukchan Kim, Tokyo (JP); Tohru Yashiro, Kanagawa (JP); Yoshihisa Naijo, Kanagawa (JP); Kohji Takeuchi, Kanagawa (JP); Takaaki Konno, Kanagawa (JP); Shun Goto, Ibaraki (JP); Yasuhiro Takahashi, Kanagawa (JP)

(72) Inventors: Sukchan Kim, Tokyo (JP); Tohru Yashiro, Kanagawa (JP); Yoshihisa Naijo, Kanagawa (JP); Kohji Takeuchi, Kanagawa (JP); Takaaki Konno, Kanagawa (JP); Shun Goto, Ibaraki (JP); Yasuhiro Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/645,194

(22) Filed: Jul. 10, 2017

(65) Prior Publication Data
US 2018/0017835 A1    Jan. 18, 2018

(30) Foreign Application Priority Data
Jul. 13, 2016    (JP) ................................ 2016-138180

(51) Int. Cl.
*G02F 1/153*    (2006.01)
*G02B 1/04*    (2006.01)
(Continued)

(52) U.S. Cl.
CPC ............ *G02F 1/1533* (2013.01); *G02B 1/041* (2013.01); *G02C 7/101* (2013.01);
(Continued)

(58) Field of Classification Search
CPC ....... G02B 1/041; G02C 7/10101; G09G 3/16; G09G 3/19; G09G 3/38; B29C 51/00;
(Continued)

(56) References Cited

U.S. PATENT DOCUMENTS

| | | | | |
|---|---|---|---|---|
| 5,187,607 A | * | 2/1993 | Endo | ....................... G02F 1/153 359/266 |
| 7,370,963 B2 | * | 5/2008 | Cano | ................ B29D 11/00826 351/159.6 |

(Continued)

FOREIGN PATENT DOCUMENTS

| | | |
|---|---|---|
| JP | 5-165063 | 6/1993 |
| JP | 2015-096879 | 5/2015 |
| JP | 2016-105150 | 6/2016 |

OTHER PUBLICATIONS

U.S. Appl. No. 15/315,103, filed Jun. 17, 2015.
(Continued)

*Primary Examiner* — William R Alexander
*Assistant Examiner* — Tamara Y. Washington
(74) *Attorney, Agent, or Firm* — Oblon, McClelland, Maier & Neustadt, L.L.P.

(57) ABSTRACT

An electrochromic device is provided. The electrochromic device includes a laminated body having a curved surface shape and an optical lens on a first surface of the laminated body. The laminated body includes a substrate, a first electrode layer on the substrate, an electrochromic layer in contact with the first electrode layer, a second electrode layer facing the first electrode layer, and a solid electrolyte layer
(Continued)

between the first electrode layer and the second electrode layer and in contact with electrochromic layer.

12 Claims, 5 Drawing Sheets

(51) Int. Cl.
| | | |
|---|---|---|
| G02C 7/10 | (2006.01) | |
| G02F 1/1333 | (2006.01) | |
| G02F 1/1335 | (2006.01) | |
| G02F 1/157 | (2006.01) | |
| G02F 1/1523 | (2019.01) | |
| G02F 1/1516 | (2019.01) | |
| G02F 1/15 | (2019.01) | |

(52) U.S. Cl.
CPC .. *G02F 1/133305* (2013.01); *G02F 1/133526* (2013.01); *G02F 1/153* (2013.01); *G02F 1/157* (2013.01); *G02F 1/1523* (2013.01); *G02F 1/15165* (2019.01); *G02F 2001/164* (2019.01)

(58) Field of Classification Search
CPC ......... G02F 1/133305; G02F 1/133526; G02F 1/1345; G02F 1/15; G02F 1/1506; G02F 1/1508; G02F 1/1523; G02F 1/1525; G02F 1/153; G02F 1/1533; G02F 1/155; G02F 1/157; G02F 1/161; G02F 2001/1515; G02F 2001/1519; G02F 2001/1536; G02F 2201/50; G02F 2201/501; G02F 2201/56; G02F 2203/01; B29D 11/0073; E06B 3/6722; C09K 9/02; B32B 37/00; B32B 37/14; B32B 37/16; B32B 37/182; B32B 17/10431; B32B 17/1044; B32B 17/10513; B32B 17/06; B32B 2305/00; H01S 3/06754; H01S 3/0941; H01S 3/094076
USPC ......... 359/265, 270, 275; 345/105; 156/151, 156/299, 300; 351/41, 44; 204/165, 204/192.26
See application file for complete search history.

(56) References Cited

U.S. PATENT DOCUMENTS

| | | | |
|---|---|---|---|
| 7,535,614 B1* | 5/2009 | Tapley | B60J 3/04 345/105 |
| 7,808,692 B2* | 10/2010 | Karmhag | A42B 3/226 359/265 |
| 9,304,368 B2* | 4/2016 | Yashiro | G02F 1/1525 |
| 10,126,623 B2* | 11/2018 | Goto | G02C 7/101 |
| 2009/0231663 A1 | 9/2009 | Hirano et al. | |
| 2010/0002287 A1 | 1/2010 | Naijo et al. | |
| 2011/0222139 A1 | 9/2011 | Naijo et al. | |
| 2011/0279884 A1 | 11/2011 | Fujimura et al. | |
| 2012/0033286 A1 | 2/2012 | Yashiro et al. | |
| 2012/0050838 A1 | 3/2012 | Hirano et al. | |
| 2012/0154892 A1 | 6/2012 | Yashiro et al. | |
| 2012/0194894 A1 | 8/2012 | Yashiro et al. | |
| 2013/0258439 A1 | 10/2013 | Naijo et al. | |
| 2013/0335802 A1 | 12/2013 | Kim et al. | |
| 2014/0078569 A1 | 3/2014 | Takahashi et al. | |
| 2014/0268284 A1 | 9/2014 | Naijo et al. | |
| 2015/0168796 A1 | 6/2015 | Yashiro et al. | |
| 2015/0198857 A1 | 7/2015 | Yashiro et al. | |
| 2015/0274761 A1 | 10/2015 | Sagisaka et al. | |
| 2015/0331295 A1 | 11/2015 | Takahashi et al. | |
| 2015/0378233 A1 | 12/2015 | Fujimura et al. | |
| 2016/0005375 A1 | 1/2016 | Naijo et al. | |
| 2016/0108072 A1 | 4/2016 | Inoue et al. | |
| 2016/0209721 A1* | 7/2016 | Matsumoto | G02F 1/13439 |
| 2016/0349590 A1 | 12/2016 | Ohshima et al. | |
| 2017/0010514 A1 | 1/2017 | Yashiro et al. | |
| 2017/0131609 A1 | 5/2017 | Okada et al. | |
| 2017/0168366 A1 | 6/2017 | Shinoda et al. | |
| 2017/0176833 A1* | 6/2017 | Goto | G02C 7/101 |
| 2017/0329197 A1* | 11/2017 | Yashiro | G02F 1/1506 |
| 2018/0299740 A1* | 10/2018 | Takeuchi | G02F 1/153 |

OTHER PUBLICATIONS

U.S. Appl. No. 15/502,367, filed Jul. 23, 2015.
Chad M. Amb, et al., "Navigating the Color Palette of Solution-Processable Electrochromic Polymers" Chem. Mater., 2011, 23, pp. 397-415.
Anil Kumar, et al., "Soluble Alkyl-Substituted Poly(ethylenedioxythiophenes) as Electrochromic Materials" Macromolecules, 1996, 29, pp. 7629-7630.
Masayoshi Higuchi, "Electrochromic Organic—Metallic Hybrid Polymers: Fundamentals and Device Applications" Polymer Journal, vol. 41, No. 7, pp. 511-520, 2009.

* cited by examiner

_US 10,488,730 B2_

ELECTROCHROMIC DEVICE, METHOD FOR, MANUFACTURING ELECTROCHROMIC DEVICE, AND ELECTROCHROMIC LIGHT CONTROL DEVICE

CROSS-REFERENCE TO RELATED APPLICATIONS

This patent application is based on and claims priority pursuant to 35 U.S.C. § 119(a) to Japanese Patent Application No. 2016-138180, filed on Jul. 13, 2016 in the Japan Patent Office, the entire disclosure of which is hereby incorporated by reference herein.

BACKGROUND

Technical Field

The present disclosure relates to an electrochromic device, a method for manufacturing an electrochromic device, and an electrochromic light control device.

Description of the Related Art

Electrochromism is the phenomenon displayed by some materials of reversibly changing color as a redox reaction reversibly occurs in the materials in response to a voltage. Devices utilizing electrochromism (hereinafter "electrochromic devices") are known. Electrochromic devices have been actively studied recently with expectation of various applications of electrochromism.

An electrochromic device is generally prepared by forming an electrochromic material between two electrodes facing each other and bonding the electrodes via an ion-conductive electrolyte layer. Thus, the electrochromic device is easily applicable to a planar configuration but is not easily applicable to a device having a curved surface or a three-dimensional shape. If applicable to objects having a three-dimensional shape such as a lens, electrochromic devices could become more widely applied to optical use.

However, it is generally difficult to form an electrochromic device on a curved or three-dimensional surface. Electrochromic materials are generally weak in terms of mechanical strength. When coating the surface of a three-dimensional object, an electrochromic material may be easily destroyed in a drop ball test, static pressure loading test, or wiping test.

It is also difficult to directly form an electrochromic device on spectacle lenses because the curvatures of the lenses differ from one another depending on the spectacle power required by individual wearers. In addition, directly forming an electrochromic device on an optical lens, which is an expensive substrate, involves repeated processes of vacuum film formation or wet coating on the lens, resulting in a cost rise in case of the occurrence of product failure.

SUMMARY

In accordance with some embodiments of the present invention, an electrochromic device is provided. The electrochromic device includes a laminated body having a curved surface shape and an optical lens on a first surface of the laminated body. The laminated body includes a substrate, a first electrode layer on the substrate, an electrochromic layer in contact with the first electrode layer, a second electrode layer facing the first electrode layer, and a solid electrolyte layer between the first electrode layer and the second electrode layer and in contact with electrochromic layer.

In accordance with some embodiments of the present invention, a method for manufacturing an electrochromic device is provided. The method includes the processes of thermoforming a laminated body to give the laminated body a curved surface shape; and adhering an optical lens to the laminated body.

In accordance with some embodiments of the present invention, an electrochromic light control device is provided. The electrochromic light control device includes the above electrochromic device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
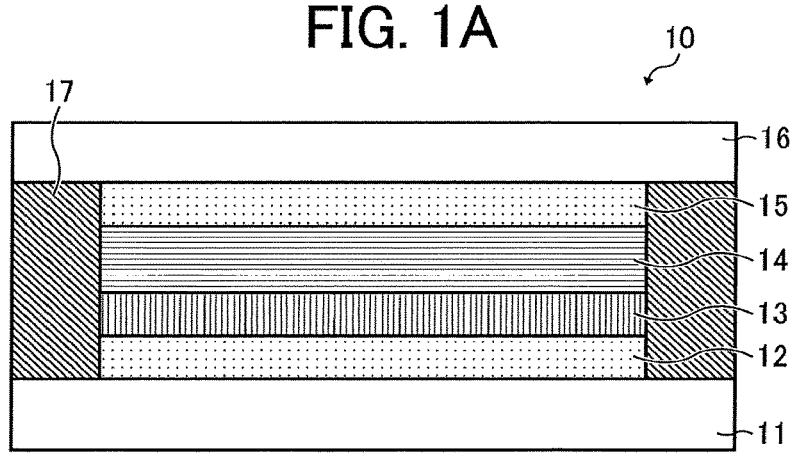
FIG. 1A is a schematic cross-sectional view of an electrochromic device according to a first embodiment of the present invention, before being thermoformed.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

One object of the present invention is to provide an electrochromic device having excellent mechanical strength and a curved surface shape that is suitable for optical application.

In accordance with some embodiments of the present invention, an electrochromic device is provided having excellent mechanical strength and a curved surface shape that is suitable for optical application.

Electrochromic Device

The electrochromic device according to an embodiment of the present invention includes a laminated body having a curved surface shape. The laminated body includes: a substrate; a first electrode layer on the substrate; an electrochromic layer in contact with the first electrode layer; a second electrode layer facing the first electrode layer; and a solid electrolyte layer between the first electrode layer and the second electrode layer and in contact with electrochromic layer. The electrochromic device further includes an optical lens on one surface of the laminated body.

The electrochromic device according to an embodiment of the present invention is achieved given that conventional methods have not solved the problem in directly forming an electrochromic device on a curved or three-dimensional surface. Such conventional methods include, for example, covering the external side of an electrochromic layer formed on a lens surface with an organic or inorganic protective layer, or forming an electrochromic device on a lens without optical correction and bonding another lens with optical correction thereto.

The laminated body has a curved surface shape that can be formed by thermoforming, and an optical lens is disposed on at least one surface of the laminated body. Such an electrochromic device has high mechanical strength and a desired curved surface shape and is therefore useful for optical applications such as lenses.

The optical lens may be formed on one surface of the laminated body, as described above. Alternatively, the optical lens may be formed in such a manner that the laminated body is embedded therein.

Preferably, the optical lens comprises at least one transparent material selected from polycarbonate resin, ally diglycol carbonate resin, diallyl carbonate resin, diallyl phthalate resin, urethane resin, thiourethane resin, episulfide resin, acrylate resin, methacrylate resin, and cycloolefin resin. Among these resins, polycarbonate resin, thiourethane resin, and allyl diglycol resin are preferable in terms of mechanical strength.

The optical lens can be adhesively formed on the laminated body by melting and hardening the transparent material, or curing the transparent material by light or heat, while the transparent material is contacting one surface of the laminated body. Alternatively, the laminated body and the optical lens may be adhered to each other via an adhesive layer.

For improving mechanical strength, the laminated body and the optical lens are preferably adhered to each other via an adhesive layer.

The adhesive layer may comprise a transparent material such as epoxy resin, urethane resin, acrylic resin, and vinyl acetate resin. Among these resins, acrylic resin is preferable.

For abrasion resistance, the substrate preferably forms the other surface of the laminated body.

The electrochromic device includes at least one substrate. The electrochromic device may include either one substrate or two substrates. Using only one substrate has a cost-reducing effect.

The substrate may comprise a resin substrate. The laminated body consisting of a resin substrate in a planer shape and multiple layers laminated thereon can be thermoformed so as to have a desired curved surface shape. Such a laminated body can provide a large-size electrochromic device with high productivity.

Preferably, the substrate comprises at least one of polycarbonate resin, polyethylene terephthalate resin, polymethyl methacrylate resin, urethane resin, polyolefin resin, and polyvinyl alcohol resin. Among these resins, polycarbonate resin, polyethylene terephthalate resin, and polymethyl methacrylate resin are preferable in terms of moldability and coating film formation property.

The desired curved surface shape refers to the shape of a curved surface with a specific curvature, such as spherical, cylindrical, conical, and three-dimensional. In the present disclosure, at least a part of the laminated body has the desired curved surface shape. Either a part of or the entire laminated body can have the desired curved surface shape.

Examples of the thermoforming include, but are not limited to, heat-molding the laminated body with convex and concave molds each having a desired three-dimensional shape without fixing one end part of the substrate. The thermoforming may be combined with vacuum molding.

Since the electrolyte layer is solid, changes in layer thickness and in-plane distribution of the electrolyte caused by thermoforming are small. In addition, the electrolyte layer can be prevented from leaking during thermoforming.

Preferably, the substrate and the optical lens each comprise a resin resistant to at least one of a wiping test, drop ball test, and static pressure loading test, in terms of thermal mechanical strength.

The wiping test can be performed based on a method according to JIS (Japanese Industrial Standards) T7334: 2011, JIS T7336: 2011, or ISO (International Organization for Standardization) 8980-5.

The drop ball test can be performed based on a method according to FDA (Food and Drug Administration) Sec. 801.410.

The static pressure loading test can be performed based on a method according to JIS T7331:2006 and ISO 14889:2003.

Preferably, the optical lens comprises at least one of polycarbonate resin, allyl diglycol carbonate resin, diallyl carbonate resin, diallyl phthalate resin, urethane resin, thiourethane resin, episulfide resin, acrylate resin, methacrylate resin, and cycloolefin resin, in terms of thermal mechanical strength.

Method for Manufacturing Electrochromic Device

A method for manufacturing the electrochromic device according to an embodiment of the present invention includes the processes of thermoforming the laminated body to have a desired curved surface shape and adhering an optical lens to the laminated body. The method may further include other processes, if needed.

The thermoforming preferably includes heat-molding the laminated body with convex and concave molds each having a desired three-dimensional shape without fixing one end part of the substrate.

The heating temperature in the thermoforming is, preferably, equal to or higher than the softening point of the material comprising the substrate. For example, in a case in which the substrate comprises a polycarbonate resin, the heating temperature is preferably in the range of from 130° C. to 190° C.

In the process of adhering an optical lens to the laminated body, a transparent material that becomes the optical lens may be melted and hardened, or cured by light or heat, while the transparent material is contacting one surface of the laminated body, so that the optical lens is adhesively formed on the laminated body. Alternatively, the laminated body and the optical lens may be adhered to each other via an adhesive layer.

Preferably, the optical lens to be adhered to the external surface of the substrate has a temporary spectacle power and thickness. After being adhered to the substrate, the optical lens can be formed into a desired curved surface shape by cutting. The optical lens can be processed to have desired characteristics (e.g., spectacle power) with a high degree of accuracy according to specific user conditions. There is no need to prepare separate molds for each product different in shape. Thus, a wide variety of products can be produced in small quantities.

Embodiments of the present invention are described below with reference to the drawings. The same reference numbers are given to identical constituent elements such as parts and materials having the same functions, and redundant descriptions thereof are omitted.

Figure 1B:
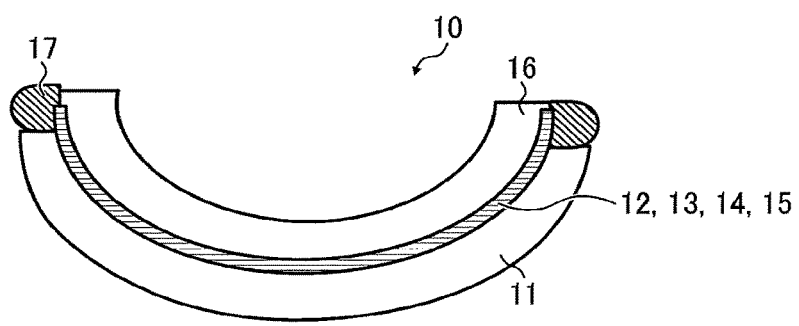
FIG. 1B is a schematic cross-sectional view of the electrochromic device according to the first embodiment of the present invention, after being thermoformed.
Figure 1C:
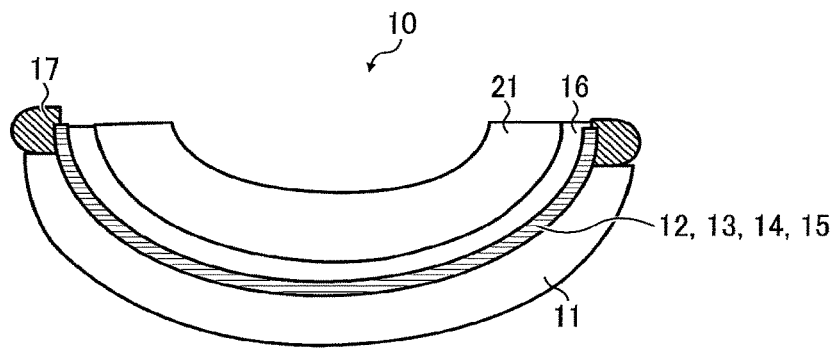
FIG. 1C is a schematic cross-sectional view of the electrochromic device according to the first embodiment of the present invention, after an optical lens is formed.

Electrochromic Device According to First Embodiment and Manufacturing Method Therefor FIGS. 1A to 1C are schematic cross-sectional views of an electrochromic device 10 according to a first embodiment of the present invention. FIGS. 1A, 1B, and 1C illustrate the electrochromic device 10 in respective states before being thermoformed, after being thermoformed, and after an optical lens is adhered. Referring to FIGS. 1A to 1C, the electrochromic device 10 includes: a first substrate 11; a first electrode layer 12 and an electrochromic layer 13 successively laminated on the first substrate 11; a second substrate 16; a second electrode layer 15 and an electrolyte layer 14 successively laminated on the second substrate 16; and a protective layer 17 sealing an outer peripheral part of the laminated body.

In the electrochromic device 10, the first electrode layer 12 is disposed on the first substrate 11, and the electrochromic layer 13 is disposed in contact with the first electrode layer 12. The second electrode layer 15 is disposed on the electrochromic layer 13 via the electrolyte layer 14 so as to face the first electrode layer 12.

For the sake of simplicity, the surfaces of the first electrode layer 12 and the second electrode layer 15 facing each other are hereinafter referred to as "inner surfaces", and the opposite surfaces of the inner surfaces are hereinafter referred to as "outer surfaces". In the first embodiment, the inner surface of the first electrode layer 12 is in contact with the electrochromic layer 13, and the outer surface of the first electrode layer 12 is in contact with the first substrate 11. The inner surface of the second electrode layer 15 is in contact with the electrolyte layer 14, and the outer surface of the second electrode layer 15 is in contact with the second substrate 16. In FIG. 1C, a reference numeral 21 denotes an optical lens.

The electrochromic device 10 according to the first embodiment may be manufactured by a method including the processes of: successively laminating the first electrode layer 12 and the electrochromic layer 13 on the first substrate 11; forming the second electrode layer 15 on the second substrate 16; forming and hardening the electrolyte layer 14 between the first substrate 11 and the second substrate 16; sealing an outer peripheral part of the laminated body with the protective layer 17; and thermoforming the laminated body to impart a desired curved surface shape thereto.

Alternatively, the electrochromic device 10 according to the first embodiment may be manufactured by another method including the processes of: successively laminating the first electrode layer 12 and the electrochromic layer 13 on the first substrate 11; forming and hardening the electrolyte layer 14 on the electrochromic layer 13; laminating the second electrode layer 15 on the electrolyte layer 14; forming the second substrate 16 with a cured resin on the second electrode layer 15; sealing an outer peripheral part of the laminated body with the protective layer 17; and thermoforming the laminated body to impart a desired curved surface shape thereto.

In the embodiment illustrated in FIG. 1B, the first substrate 11 that is disposed on the electrochromic layer 13 side is processed to have a convex spherical surface shape. It is also possible that the first substrate 11 is processed to have a concave spherical surface shape.

The electrolyte layer 14 is a solid electrolyte layer. Preferably, inorganic fine particles are mixed therein. Due to such a configuration, changes in layer thickness and in-plane distribution of the electrolyte, caused by thermoforming, can be reduced. In addition, the electrolyte layer can be prevented from leaking during thermoforming.

Preferably, the solid electrolyte layer comprises a solid solution of an ionic liquid and a matrix polymer containing oxyalkylene chains (e.g., oxyethylene chain, oxypropylene chain). As the electrolyte layer becomes more homogeneous, a redox reaction can occur in a more reliable manner. The inorganic fine particles may be contained in the electrochromic layer.

As a voltage is applied to between the first electrode layer 12 and the second electrode layer 15 in the electrochromic device 10, a redox reaction occurs in the electrochromic layer 13 due to charge transfer, thereby developing or discharging color.

The electrochromic device according to the first embodiment can be formed into a desired three-dimensional curved surface shape by thermoforming. The electrochromic device according to the first embodiment can be large in size to provide high productivity.

Furthermore, the electrochromic device according to the first embodiment can provide excellent color properties with the use of an organic electrochromic material.

Constitutional elements of the electrochromic device 10 according to the first embodiment are described in detail below.

Substrates

The first substrate 11 and the second substrate 16 have the function of supporting the first electrode layer 12, electrochromic layer 13, electrolyte layer 14, second electrode layer 15, and protective layer 17.

The first substrate 11 and the second substrate 16 may comprise any type of thermoformable resin material so long as they can support the above layers.

For example, the first substrate 11 and the second substrate 16 may comprise polycarbonate resin, polyethylene terephthalate resin, polymethyl methacrylate resin, urethane resin, polyolefin resin, and/or polyvinyl alcohol resin.

In a case in which the electrochromic device 10 is a reflective display device visible from the second electrode layer 15 side, it is not necessary that one of the first substrate 11 and the second substrate 16 be transparent. The first substrate 11 and the second substrate 16 may have a surface coating, such as a transparent insulating layer and an anti-reflection layer, for improving vapor barrier property, gas barrier property, and visibility.

Preferably, the first substrate 11 and the second substrate 16 have an average thickness within a range of from 0.2 to 1.0 mm so as to be easily thermoformable.

First Electrode Layer and Second Electrode Layer

Preferably, the first electrode layer 12 and the second electrode layer 15 comprise a transparent conductive oxide material, such as tin-doped indium oxide (ITO), fluorine-doped tin oxide (FTO), and antimony-doped tin oxide (ATO). In particular, a thin film of an inorganic material comprising at least one of indium oxide, tin oxide, and zinc oxide that is formed by vacuum film formation is preferable.

Indium oxide, tin oxide, and zinc oxide are easy to form a film by sputtering and to impart excellent transparency and electric conductivity. Specifically, InSnO, GaZnO, SnO, $In_2O_3$, ZnO, and InZnO are preferable. Preferably, the crystallinity of each electrode layer is as low as possible. This is because high crystallinity causes disruption of the electrode layer during thermoforming. Accordingly, IZO and AZO that form a highly-conductive amorphous film are preferable. Preferably, the laminated body containing such an electrode layer materials is thermoformed such that the maximum major-axis length of the curved substrate in the laminated body after thermoforming is 120% or less, more preferably 103% or less, of that of the planer substrate in the laminated body before the thermoforming.

In addition, a transparent conductive metal thin film comprising silver, gold, copper, and/or aluminum, a carbon film of carbon nanotube or graphene, a network electrode of a conductive metal, conductive carbon, and/or conductive oxide, and a composite layer thereof are preferable. The network electrode is a transmissive electrode formed by a fine network of carbon nanotube or a highly-conductive non-transmissive material. The network electrode is resistant to disruption during thermoforming, which is preferable.

Furthermore, the electrode layer may preferably comprise a laminated structure of the network electrode and the conductive oxide or another laminated structure of the conductive metal thin film and the conductive oxide. The laminated structure allows the electrochromic layer to develop and discharge color more evenly. The layer of the conductive oxide can be formed by application of a nano-particle ink containing the conductive oxide. Examples of the laminated structure of the conductive metal thin film and the conductive oxide include a laminated structure of thin films of ITO/Ag/ITO that has both conductivity and transparency.

The thicknesses of the first electrode layer 12 and the second electrode layer 15 are so adjusted that they have the appropriate electric resistance required for causing a redox reaction in the electrochromic layer 13.

In a case in which the first electrode layer 12 and the second electrode layer 15 each comprise an ITO film formed by vacuum film deposition, preferably, the thicknesses thereof range from 20 to 500 nm, more preferably from 50 to 200 nm.

In a case in which the conductive oxide layer is formed by application of a nano-particle ink, preferably, the thickness thereof ranges from 0.2 to 5 μm. The thickness of the network electrode preferably ranges from 0.2 to 5 μm.

In a case in which the electrochromic device 10 is used as a light control mirror, at least one of the first electrode layer 12 and the second electrode layer 15 may have a structure exhibiting a reflex function. In this case, the first electrode layer 12 and the second electrode layer 15 may comprise a metal material. Specific examples of the metal material include, but are not limited to, Pt, Ag, Au, Cr, rhodium, Al, and alloys and laminated bodies thereof.

The first electrode layer 12 and the second electrode layer 15 can be formed by vacuum vapor deposition, sputtering, or ion plating. In addition, the first electrode layer 12 and the second electrode layer 15 can be formed by spin coating, casting, micro gravure coating, gravure coating, bar coating, roll coating, wire bar coating, dip coating, slit coating, capillary coating, spray coating, nozzle coating, or various printing methods, such as gravure printing, screen printing, flexo printing, offset printing, reverse printing, and inkjet printing.

Electrochromic Layer

The electrochromic layer 13 comprises an electrochromic material.

Examples of the electrochromic material include inorganic electrochromic compounds and organic electrochromic compounds. Examples of the electrochromic material further include conductive polymers exhibiting electrochromism.

Specific examples of the inorganic electrochromic compounds include, but are not limited to, tungsten oxide, molybdenum oxide, iridium oxide, and titanium oxide.

Specific examples of the organic electrochromic compounds include, but are not limited to, viologen, rare-earth phthalocyanine, and styryl.

Specific examples of the conductive polymers include, but are not limited to, polypyrrole, polythiophene, polyaniline, and derivatives thereof.

Preferably, the electrochromic layer 13 comprises conductive or semiconductive fine particles carrying an organic electrochromic compound thereon. More specifically, the conductive or semiconductive fine particles may have a particle diameter of from 5 to 50 nm and may be sintered on a surface of the electrode. The organic electrochromic compound may have a polar group such as phosphonate group, carboxyl group, and silanol group, and may be adsorbed to the surfaces of the conductive or semiconductive fine particles.

With this configuration, electrons can be effectively injected into the organic electrochromic compound owing to a large surface effect of the fine particles. Thus, the electrochromic device according to the present embodiment can respond more rapidly compared to a conventional electrochromic display element. In addition, the electrochromic layer can be formed into a transparent film, which can be served as a display layer, by use of the fine particles. Thus, the electrochromic compound can develop color with a higher density. Furthermore, the conductive or semiconductive fine particles can carry multiple types of organic electrochromic compounds. In particular, the fine conductive particles can function as an electrode layer due to its conductivity.

Specific examples of polymer-based and dye-based electrochromic compounds include, but are not limited to, low-molecular-weight organic electrochromic compounds of azobenzene type, anthraquinone type, diarylethene type, dihydroprene type, dipyridine type, styryl type, styrylspiropyran type, spirooxazine type, spirothiopyran type, thioindigo type, tetrathiafulvalene type, terephthalic acid type, triphenylmethane type, benzidine type, triphenylamine type, naphthopyran type, viologen type, pyrazoline type, phenazine type, phenylenediamine type, phenoxazine type, phenothiazine type, phthalocyanine type, fluoran type, fulgide type, benzopyran type, and metallocene type; and conductive polymer compounds such as polyaniline and polythiophene. Each of these materials can be used alone or in combination with others.

Among these materials, viologen compounds and dipyridine compounds are preferable since they exhibit excellent color development-discharge potential and color values. In particular, a dipyridine compound represented by the following formula (1) is more preferable.

Formula (1)

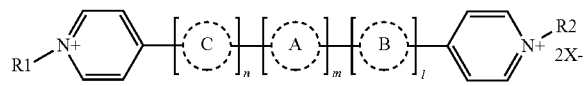

In the formula (1), each of R1 and R2 independently represents a substituted or unsubstituted alkyl or aryl group having 1 to 8 carbon atoms, while at least one of R1 and R2 has a substituent selected from COOH, PO(OH)$_2$, and Si(OC$_k$H$_{2k+1}$)$_3$, where k represents a numeral in the range of 1 to 20.

In the formula (1), X represents a monovalent anion. The monovalent anion is not limited to a particular ion so long as it forms a stable pair with a cationic part. Specific examples of the monovalent anion include, but are not limited to, Br ion (Br$^-$), Cl ion (Cl$^-$), ClO$_4$ ion (ClO$_4^-$), PF$_6$ ion (PF$_6^-$), and BF$_4$ ion (BF$_4^-$).

In the formula (1), each of n, m, and l independently represents 0, 1, or 2.

In the formula (1), each of A, B, and C independently represents a substituted or unsubstituted alkyl, aryl, or heterocyclic group having 1 to 20 carbon atoms.

Specific examples of metal-complex-based and metal-oxide-based electrochromic compounds include, but are not limited to, inorganic electrochromic compounds such as titanium oxide, vanadium oxide, tungsten oxide, indium oxide, iridium oxide, nickel oxide, and Prussian Blue.

Specific preferred materials for the conductive or semiconductive fine particles for carrying the electrochromic compound include metal oxides, but are not limited thereto.

Specific examples of the metal oxides include, but are not limited to, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, and metal oxides consisting primarily of aluminosilicate, and/or calcium phosphate. Each of these materials can be used alone or in combination with others.

In view of desired electrical properties (e.g., electric conductivity) and physical properties (e.g., optical property), at least one of titanium oxide, zinc oxide, tin oxide, zirconium oxide, iron oxide, magnesium oxide, indium oxide, and tungsten oxide is preferably used. In particular, titanium oxide or tin oxide is more preferably used for displaying colors with a higher color development-discharge response speed.

The conductive or semiconductive fine particles are not limited in shape. Preferably, the conductive or semiconductive fine particles have a shape that has a large surface area per unit volume (hereinafter "specific surface area") for effectively carrying the electrochromic compound. For example, in a case in which the fine particles are composed of an aggregate of nano particles, the fine particles can more effectively carry the electrochromic compound owing to their large specific surface area, thus providing an excellent display contrast ratio between color development and discharge.

The electrochromic layer 13, or the layer of the conductive or semiconductive fine particles, can be formed by vacuum film deposition or application of a particle dispersion paste. The latter is more preferable in terms of productivity.

Preferably, the electrochromic layer 13 has an average thickness of from 0.2 to 5.0 µm. When the average thickness is from 0.2 to 5.0 µm, color developing density remains high and visibility remains excellent without being deteriorated by the occurrence of color development.

Electrolyte Layer

The electrolyte layer 14 is a solid electrolyte layer formed of a light-curable or heat-curable resin film holding an electrolyte therein. Preferably, inorganic fine particles are mixed in the electrolyte layer for controlling the layer thickness.

Preferably, the electrolyte layer 14 is formed by applying a mixed solution of the inorganic fine particles, a curable resin, and the electrolyte onto the electrochromic layer 13 and curing the applied mixed solution by light or heat into a film. Alternatively, the electrolyte layer 14 may be formed by applying a mixed solution of a curable resin and the electrolyte onto a previously-formed porous inorganic fine particle layer, so that the mixed solution can permeate the inorganic fine particle layer, and curing the applied mixed solution by light or heat into a film. In a case in which the electrochromic layer 13 comprises conductive or semiconductive nano particles carrying an electrochromic compound, the electrolyte layer 14 may be formed by applying a mixed solution of a curable resin and the electrolyte onto the electrochromic layer 13, so that the mixed solution can permeate the electrochromic layer 13, and curing the applied solution by light or heat into a film.

Examples of the electrolyte include liquid electrolytes, such as ionic liquids, and solutions of a solid electrolyte dissolved in a solvent.

Specific materials usable for the electrolyte include, but are not limited to, inorganic ion salts (e.g., alkali metal salts, alkali-earth metal salts), quaternary ammonium salts, and supporting salts of acids and bases. More specifically, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$, can be used.

Examples of the ionic liquids include all substances having been generally researched or reported.

Organic ionic liquids generally have a molecular structure that exhibits liquidity in a wide temperature range including room temperature.

Such a molecular structure comprises a cationic component and an anionic component.

Specific examples of the cationic component include, but are not limited to, aromatic salts such as imidazole derivatives (e.g., N,N-dimethylimidazole salt, N,N-methylethylimidazole salt, N,N-methylpropylimidazole salt) and pyridinium derivatives (e.g., N,N-dimethylpyridinium salt, N,N-methylpropylpyridinium salt), and aliphatic quaternary ammonium compounds such as tetraalkylammonium salts (e.g., trimethylpropylammonium salt, trimethylhexylammonium salt, triethylhexylammonium salt).

For stability in the atmosphere, specific preferred examples of the anionic component include, but are not limited to, fluorine-containing compounds such as $BF_4^-$, $CF_3SO_3^-$, $PF_4^-$, $(CF_3SO_2)_2N^-$, and $B(CN_4)^-$. Ionic liquids prepared by combining these cationic and anionic components are preferable.

Specific examples of the solvent include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

Specific examples of the curable resin include, but are not limited to, photocurable resins (e.g., acrylic resin, urethane resin, epoxy resin, vinyl chloride resin, ethylene resin, melamine resin, phenol resin) and heat-curable resins. In particular, those having high affinity for the electrolyte are preferable. Specific examples of such curable resins include ethylene glycol derivatives such as polyethylene glycol and polypropylene glycol. In particular, photocurable resins are more preferred as the curable resin. This is because a photocurable resin can be formed into a thin layer at a lower temperature within a shorter time period compared to a case in which a thin layer is formed by thermal polymerization and/or solvent evaporation.

Most preferably, the electrolyte layer comprises a solid solution of an ionic liquid and a matrix polymer containing oxyethylene and/or oxypropylene chains. In this case, it is easy to achieve desired hardness and high ion conductivity at the same time.

The inorganic fine particle is not limited to any particular material so long as it forms a porous layer that can hold the electrolyte and the curable resin. For electrochromic reaction stability and visibility, materials having high insulating property, transparency, and durability are preferably used therefor. Specific materials for the inorganic fine particle include, but are not limited to, oxides and sulfates of silicon, aluminum, titanium, zinc, and tin, and mixtures thereof.

The inorganic fine particle is not limited in size. Preferably, the inorganic fine particle has an average particle diameter in the range of from 10 nm to 10 μm, more preferably from 10 to 100 nm.

Protective Layer

The protective layer 17 is formed so as to physically and chemically protect the side surfaces of the electrochromic device. The protective layer 17 may be formed by applying an ultraviolet-curable or heat-curable insulating resin so as to cover the side surfaces and/or upper surface of the laminated body and thereafter curing the resin. Preferably, the protective layer is a laminated layer of a curable resin and an inorganic material. Such a laminated layer of a curable resin and an inorganic material improves barrier property against oxygen and/or water.

Specific preferred examples of the inorganic material include, but are not limited to, highly insulating, transparent, and durable materials, such as oxides and sulfates of silicon, aluminum, titanium, zinc, and tin, and mixtures thereof. Such materials can be easily formed into a film by vacuum film deposition processes such as sputtering and vapor deposition.

Preferably, the protective layer 17 has an average thickness of from 5 to 100 μm. The protective layer may be formed after the process of thermoforming.

Preferably, the electrochromic device according to some embodiments of the present invention has the properties described below.

Preferably, the refractive indexes n1, n2, and n3 of the substrate, optical lens, and adhesive layer, respectively, satisfy the relation $n1 \le n3 \le n2$, for reducing reflection at the adhesion interface and providing transparency.

Alternatively, preferably, the refractive indexes n1, n2, and n3 of the substrate, optical lens, and adhesive layer, respectively, satisfy the relation $n2 \le n3 \le n1$, for reducing reflection at the adhesion interface and providing transparency.

The refractive indexes can be measured with a multi-wavelength Abbe refractometer (DR-M2 available from ATAGO CO., LTD.).

Preferably, the linear expansion coefficients α1, α2, and α3 of the substrate, optical lens, and adhesive layer, respectively, satisfy the relation $\alpha1 \le \alpha3 \le \alpha2$, in terms of thermal stability and mechanical stability.

Alternatively, preferably, the linear expansion coefficients α1, α2, and α3 of the substrate, optical lens, and adhesive layer, respectively, satisfy the relation $\alpha2 \le \alpha3 \le \alpha1$, in terms of thermal stability and mechanical stability.

The linear expansion coefficients can be measured with a thermomechanical analysis (TMA) instrument (available from Kobelco Research Institute, Inc.).

Preferably, the Abbe's numbers v1 and v2 of the substrate and optical lens, respectively, satisfy the relation $v1 \le v2$, for reducing chromatic aberration.

The Abbe's numbers can be measured with a multi-wavelength Abbe refractometer (DR-M2 available from ATAGO CO., LTD.).

Electrochromic Device According to First Embodiment

FIG. 1C is a schematic cross-sectional view of the electrochromic device 10 according to the first embodiment after an optical lens is adhered. Referring to FIG. 1C, an optical lens 21 is adhered to one outer surface of the laminated body, and the first substrate 11 forms the other outer surface of the laminated body.

Specific preferred materials for the optical lens 21 include, but are not limited to, transparent materials such as polycarbonate resin, allyl diglycol carbonate resin, diallyl carbonate resin, diallyl phthalate resin, urethane resin, thiourethane resin, episulfide resin, methacrylate resin, and cycloolefin resin.

The optical lens 21 can be adhesively formed on the laminated body by melting and hardening the transparent material, or curing the transparent material by light or heat, while the transparent material is contacting one surface of the laminated body. The method for adhesively forming the optical lens 21 on the laminated body is not limited thereto.

It is possible to impart a desired spectacle power to the electrochromic device by adjusting the curvature of incoming and/or outgoing planes of the optical lens 21 based on the curvature radius thereof after curing, determined considering a deformation caused by contraction.

The optical lens 21 can be formed into a desired curved surface shape by cutting. The optical lens 21 can be processed to have desired characteristics (e.g., spectacle power) according to specific user conditions. There is no need to prepare separate molds for each product different in shape. Thus, a wide variety of high-accuracy products can be produced in small quantities.

Modification 1

An electrochromic device according to Modification 1 is different from the electrochromic device according to the first embodiment in layer structure. In describing Modification 1, the same reference numbers are given to identical constituent elements such as parts and materials having the same functions as the first embodiment describe above, and redundant descriptions thereof are omitted.

Figure 2A:
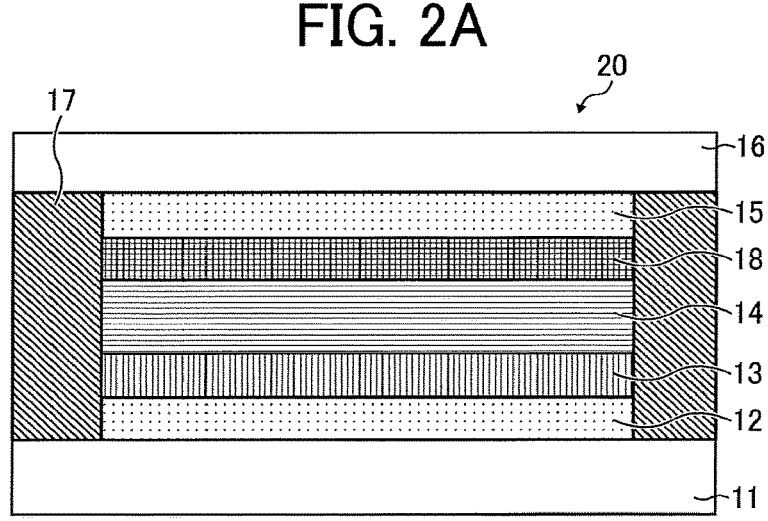
FIG. 2A is a schematic cross-sectional view of an electrochromic device according to Modification 1 of the first embodiment of the present invention, before being thermoformed.
Figure 2B:
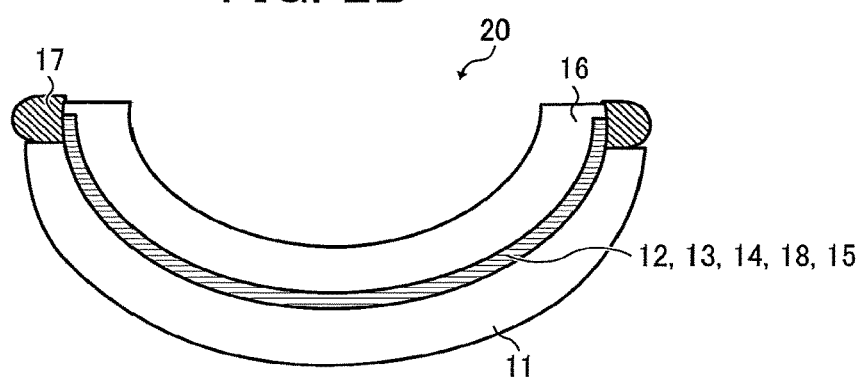
FIG. 2B is a schematic cross-sectional view of the electrochromic device according to Modification 1 of the first embodiment of the present invention, after being thermoformed.
Figure 2C:
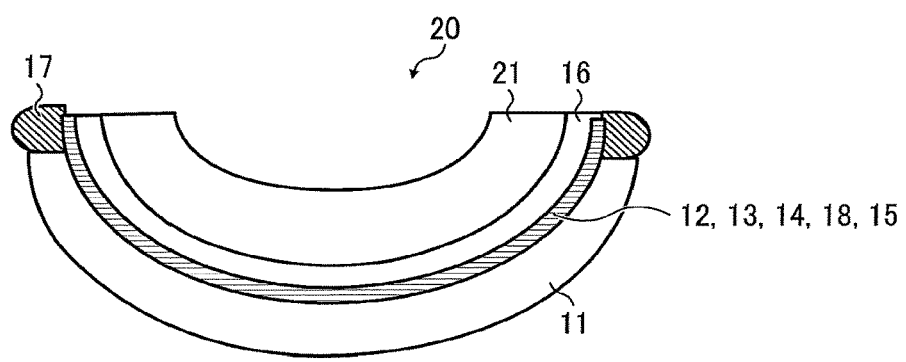
FIG. 2C is a schematic cross-sectional view of the electrochromic device according to Modification 1 of the first embodiment of the present invention, after an optical lens is formed.

FIGS. 2A to 2C are schematic cross-sectional views of an electrochromic device 20 according to Modification 1.

Referring to FIGS. 2A to 2C, the electrochromic device 20 according to Modification 1 is different from the electrochromic device 10 according to the first embodiment (illustrated in FIGS. 1A to 1C) in that an anti-deterioration layer 18 is further disposed contacting the electrolyte layer 14 and the second electrode layer 15.

The anti-deterioration layer 18 prevents the second electrode layer 15 from deteriorating by an electrochemical reaction. The electrochromic device according to Modification 1 provides better repetitive stability than the electrochromic device according to the first embodiment.

The function of the anti-deterioration layer 18 is to undergo the reverse reaction of a reaction occurring in the electrochromic layer 13 to balance the charges therebetween, so that the second electrode layer 15 is prevented from being corroded or degraded by an irreversible redox reaction. As a result, repetitive stability of the electrochromic device 20 is improved. The reverse reaction includes both a redox reaction of the anti-deterioration layer and an action thereof as a capacitor.

The anti-deterioration layer 18 comprises a material having a function of preventing the first electrode layer 12 and the second electrode layer 15 from being corroded by an irreversible redox reaction occurring therein. Specific examples of such materials include, but are not limited to, antimony tin oxide, nickel oxide, titanium oxide, zinc oxide, tin oxide, and conductive or semiconductive metal oxides containing two or more of these materials. Furthermore, the anti-deterioration layer 18 may comprise the above-described electrochromic material unless the color of the electrochromic material causes a problem.

In a case in which the electrochromic device is used as an optical element requiring transparency, the anti-deterioration layer 18 preferably comprises a highly-transparent material. Specific examples of such highly-transparent materials include, but are not limited to, fine particles of n-type semiconductive oxides (e.g., n-type semiconductive metal oxides). Specific examples of fine particles of n-type semiconductive oxides include, but are not limited to, fine particles of titanium oxide, tin oxide, zinc oxide, and compounds or mixtures thereof, having a primary particle diameter of 100 nm or less.

In a case in which the anti-deterioration layer 18 is present, the electrochromic layer 13 preferably comprises a material that undergoes a color change through an oxidation reaction. This is because, in response to an oxidation reaction occurring in the electrochromic layer 13, the n-type semiconductive metal oxide easily reduces (by electron injection) and thereby drive voltage can be reduced.

In this case, preferably, the electrochromic material comprises an organic polymer material. Organic polymer materials can be easily formed into a film by a coating process, etc., and the color thereof can be adjusted by controlling the molecular structure thereof. Examples of such organic polymer materials are described in from p. 398, l. 79 to p. 404, l. 14 and from p. 408, l. 64 to p. 410, l. 65 of the document "Chad M. Amb, et al., "Navigating the Color Palette of Solution-Processable Electrochromic Polymers", Chem. Mater., 2011, 23, pp 397-415"; on p. 7629, ll. 38-72 of the document "Anil Kumar, et al., "Soluble Alkyl-Substituted Poly(ethylenedioxythiophenes) as Electrochromic Materials", Macromolecules, 1996, 29, pp 7629-7630"; and from p. 514, l. 28 to p. 515, l. 6 and from p. 516, l. 21 to p. 518, l. 9 of the document "Masayoshi Higuchi, "Electrochromic Organic-Metallic Hybrid Polymers: Fundamentals and Device Applications", Polymer Journal, Vol. 41, No. 7, pp. 511-520, 2009", but are not limited thereto.

Specific examples of such organic polymer materials include, but are not limited to, poly(3,4-ethylenedioxythiophene)-based materials and complexation polymers of bis (terpyridine) and iron ion.

Alternatively, the anti-deterioration layer 18 may comprise a p-type semiconductive material having high transparency. Specific examples of such p-type semiconductive materials include, but are not limited to, organic materials containing nitroxyl radicals (NO radicals), such as derivatives of 2,2,6,6-tetramethylpiperidine-N-oxyl (TEMPO) and polymer materials of the derivatives.

The anti-deterioration function may be imparted to the electrolyte layer 14 by mixing an anti-deterioration material in the electrolyte layer 14, instead of disposing the anti-deterioration layer 18. In this case, the layer structure becomes similar to that of the electrochromic device 10 according to the first embodiment illustrated in FIGS. 1A to 1C.

The anti-deterioration layer 18 can be formed by vacuum vapor deposition, sputtering, or ion plating. In addition, the anti-deterioration layer 18 can be formed by spin coating, casting, micro gravure coating, gravure coating, bar coating, roll coating, wire bar coating, dip coating, slit coating, capillary coating, spray coating, nozzle coating, or various printing methods, such as gravure printing, screen printing, flexo printing, offset printing, reverse printing, and inkjet printing.

Modification 2

An electrochromic device according to Modification 2 is different from the electrochromic device according to the first embodiment in layer structure. In describing Modification 2, the same reference numbers are given to identical constituent elements such as parts and materials having the same functions as the first embodiment describe above, and redundant descriptions thereof are omitted.

Figure 3A:
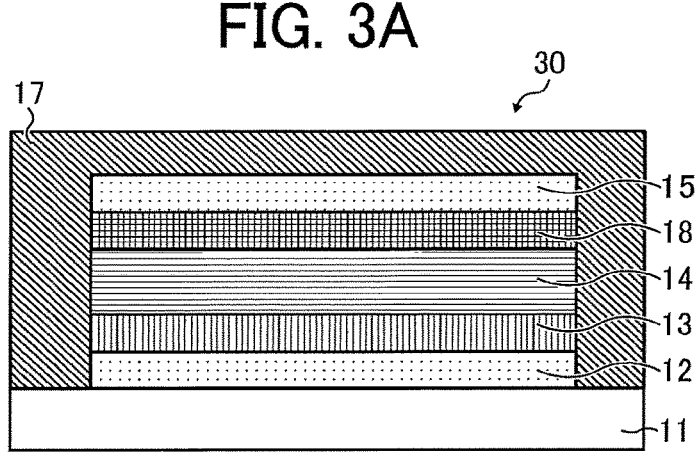
FIG. 3A is a schematic cross-sectional view of an electrochromic device according to Modification 2 of the first embodiment of the present invention, before being thermoformed.
Figure 3B:
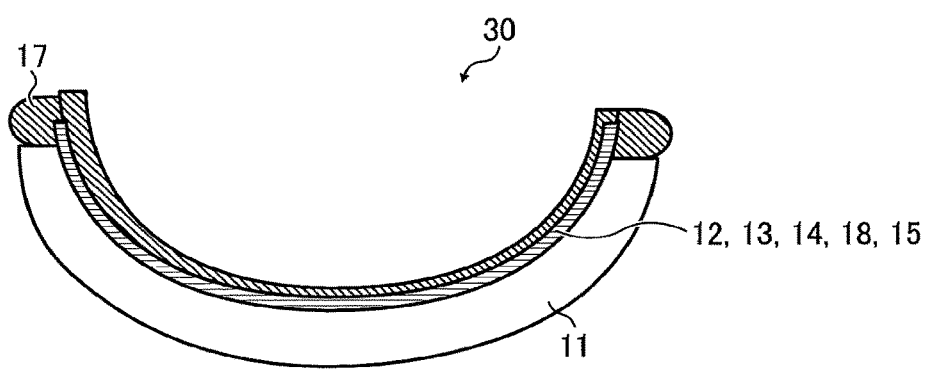
FIG. 3B is a schematic cross-sectional view of the electrochromic device according to Modification 2 of the first embodiment of the present invention, after being thermoformed.
Figure 3C:
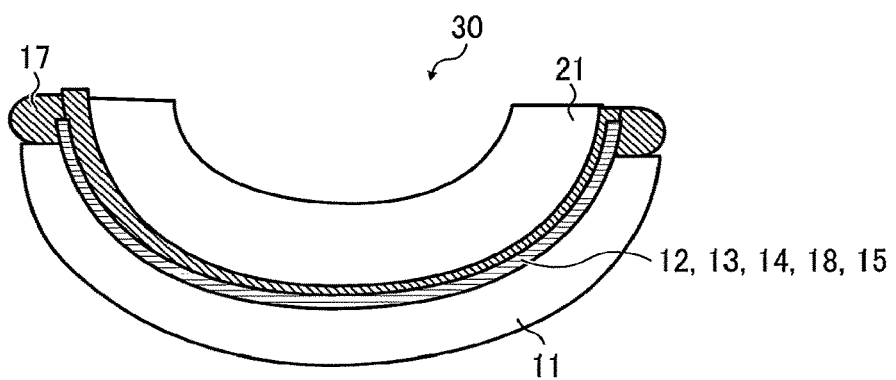
FIG. 3C is a schematic cross-sectional view of the electrochromic device according to Modification 2 of the first embodiment of the present invention, after an optical lens is formed.

FIGS. 3A to 3C are schematic cross-sectional views of an electrochromic device 30 according to Modification 2. Referring to FIGS. 3A to 3C, the electrochromic device 30 according to Modification 2 is different from the electrochromic device 20 according to Modification 1 (illustrated in FIGS. 2A to 2C) in that the second substrate 16 is omitted and the protective layer 17 is further disposed on the second electrode layer 15.

The protective layer 17 disposed on the second electrode layer 15 may comprise the same material as that disposed on the side surfaces. In other words, the material forming the protective layer 17 disposed on the second electrode layer 15 may be either the same as or different from that forming the protective layer 17 disposed on the side surfaces. The electrochromic device 30 according to Modification 2 provides a thinner device body and lower-cost production since only one substrate is included therein.

FIG. 3C is a schematic cross-sectional view of the electrochromic device 30 according to Modification 2 after an optical lens is adhered.

Referring to FIG. 3C, an optical lens 21 is adhered to one outer surface of the laminated body, and the first substrate 11 forms the other outer surface of the laminated body.

Modification 3

An electrochromic device according to Modification 3 is different from the electrochromic device according to the first embodiment in layer structure. In describing Modification 3, the same reference numbers are given to identical constituent elements such as parts and materials having the same functions as the first embodiment describe above, and redundant descriptions thereof are omitted.

Figure 4A:
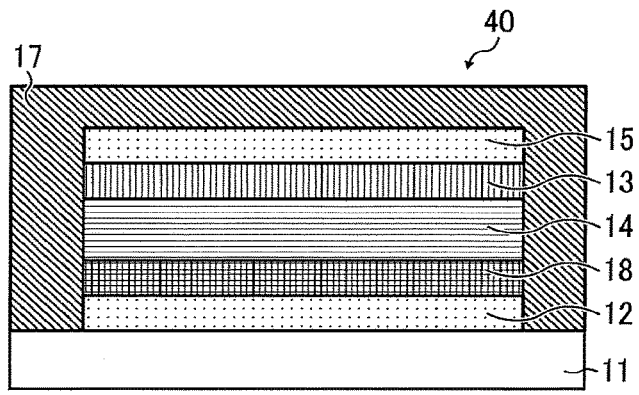
FIG. 4A is a schematic cross-sectional view of an electrochromic device according to Modification 3 of the first embodiment of the present invention, before being thermoformed.
Figure 4B:
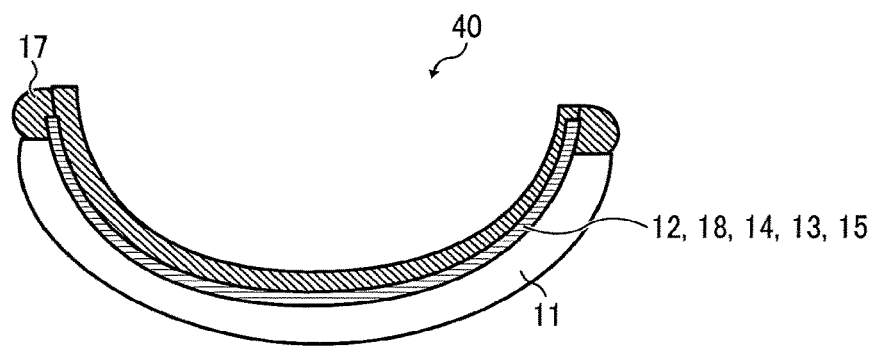
FIG. 4B is a schematic cross-sectional view of the electrochromic device according to Modification 3 of the first embodiment of the present invention, after being thermoformed.
Figure 4C:
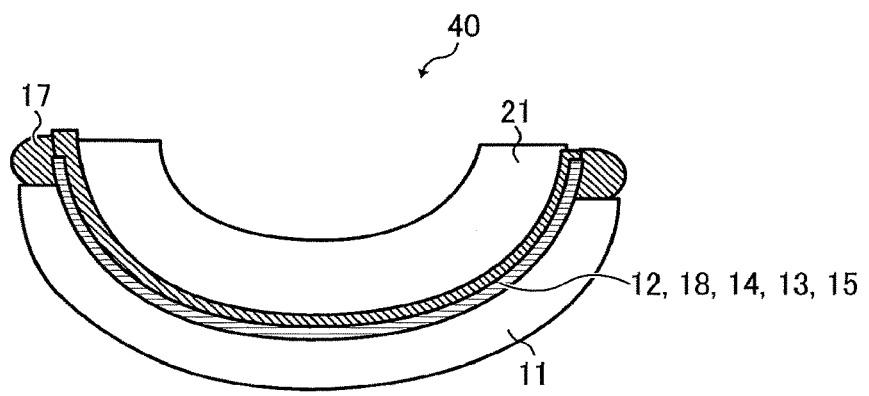
FIG. 4C is a schematic cross-sectional view of the electrochromic device according to Modification 3 of the first embodiment of the present invention, after an optical lens is formed.

FIGS. 4A to 4C are schematic cross-sectional views of an electrochromic device 40 according to Modification 3. Referring to FIGS. 4A to 4C, the electrochromic device 40 according to Modification 3 is different from the electrochromic device 30 according to Modification 2 (illustrated in FIGS. 3A to 3C) in that the positions of the electrochromic layer 13 and the anti-deterioration layer 18 are switched.

In the electrochromic device 40 according to Modification 3, as a voltage is applied to between the first electrode layer 12 and the second electrode layer 15, a redox reaction occurs in the electrochromic layer 13 due to charge transfer, thereby developing or discharging color, in the same manner as in the electrochromic device 10 according to the first embodiment having a different layer structure.

FIG. 4C is a schematic cross-sectional view of the electrochromic device 40 according to Modification 3 after an optical lens is adhered.

Referring to FIG. 4C, an optical lens 21 is adhered to one outer surface of the laminated body, and the first substrate 11 forms the other outer surface of the laminated body.

Modification 4

In an electrochromic device according to Modification 4, an optical lens 21 is formed such that the laminated body according to the first embodiment illustrated in FIG. 1B is embedded therein. In describing Modification 4, the same reference numbers are given to identical constituent elements such as parts and materials having the same functions as the first embodiment describe above, and redundant descriptions thereof are omitted.

Figure 5:
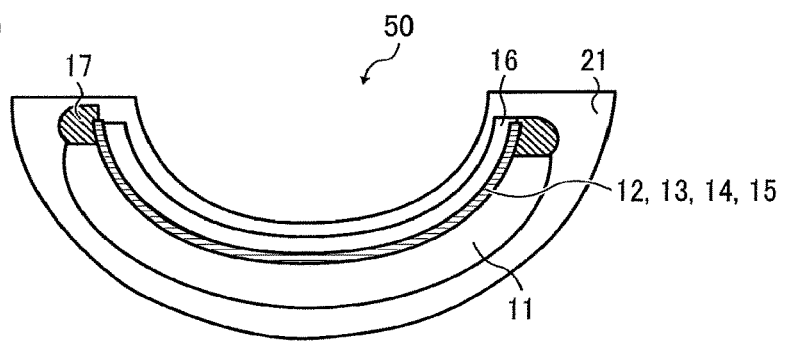
FIG. 5 is a schematic cross-sectional view of an electrochromic device according to Modification 4 of the first embodiment of the present invention, after an optical lens is formed.

FIG. 5 is a schematic cross-sectional view of an electrochromic device 50 according to Modification 4. Referring to FIG. 5, the optical lens 21 is formed such that the laminated body is embedded therein.

The electrochromic device 50 can be formed by dipping the laminated body in a transparent material in a melted state and thereafter hardening the transparent material by cooling or curing by light or heat. As a result, the optical lens 21 is formed such that the laminated body is embedded therein.

Modification 5

In an electrochromic device according to Modification 5, the laminated body according to the first embodiment illustrated in FIG. 1B and an optical lens 21 are adhered to each other via an adhesive layer 19. In describing Modification 5, the same reference numbers are given to identical constituent elements such as parts and materials having the same functions as the first embodiment describe above, and redundant descriptions thereof are omitted.

Figure 6:
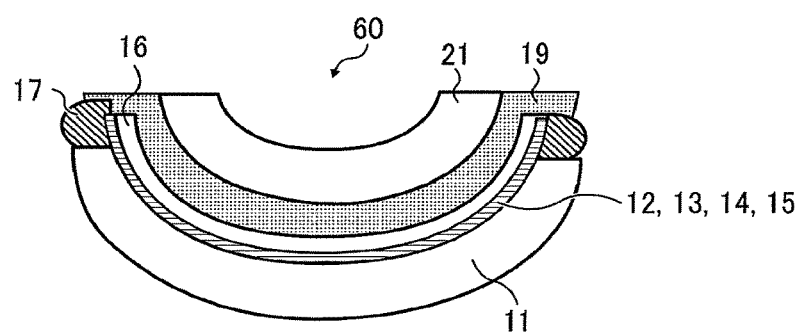
FIG. 6 is a schematic cross-sectional view of an electrochromic device according to Modification 5 of the first embodiment of the present invention, after an optical lens is formed.

FIG. 6 is a schematic cross-sectional view of an electrochromic device 60 according to Modification 5. Referring to FIG. 6, the optical lens 21 is adhered to the second substrate 16 via the adhesive layer 19. Owing to this configuration, the optical lens 21 can be prepared in the optimum manner independent from the preparation process of the laminated body. Thus, the electrochromic device 60 can be easily produced with a high degree of accuracy. In addition, inventory control of the optical lens 21 can also be conducted independent from that of the laminated body, making it possible to produce the optical lens 21 wide in varieties and small in quantities.

The adhesive layer 19 may comprise a transparent material such as epoxy resin, urethane resin, acrylic resin, vinyl acetate resin, and modified polymers.

Preferably, the adhesive layer 19 has an average thickness of from 3 to 200 μm.

Electrochromic Light Control Device

An electrochromic light control device according to an embodiment of the present invention includes the electrochromic device according to an embodiment of the present invention. The electrochromic light control device may further include optional members, if needed.

The electrochromic light control device can be preferably applied to, for example, electrochromic light control eyeglasses, anti-glare mirrors, or light control glasses. In particular, application to electrochromic light control eyeglasses is most preferred.

Examples of the optional members include, but are not limited to, a frame, power source, and switch.

Figure 7:
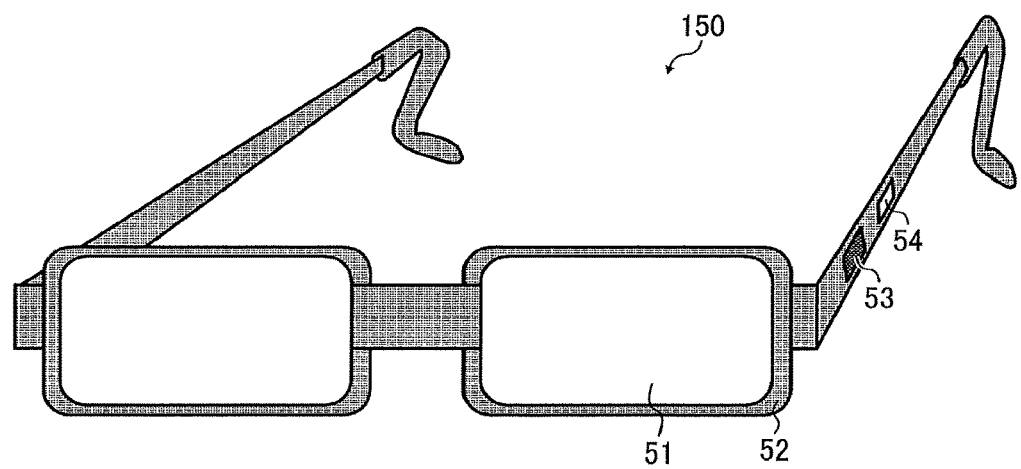
FIG. 7 is a perspective view of electrochromic light control eyeglasses including an electrochromic light control device according to an embodiment of the present invention.

FIG. 7 is a perspective view of electrochromic light control eyeglasses 150 including an electrochromic light control device according to an embodiment of the present invention. Referring to FIG. 7, the electrochromic light control eyeglasses 150 include two electrochromic light control devices 51, a frame 52, a switch 53, and a power source 54. The electrochromic light control devices 51 have been processed to have a desired shape.

The two electrochromic light control devices 51 are fitted to the frame 52. The switch 53 and the power source 54 are disposed on the frame 52. The power source 54 is electrically connected to a first electrode and a second electrode by wires via the switch 53.

The switch 53 switches the voltage applied to between the first electrode and the second electrode among a positive voltage, a negative voltage, and no voltage.

The switch 53 may be either a slide switch or a push switch, but is not limited thereto, so long as the voltage applied to between the first electrode and the second electrode can be switched between a positive voltage, a negative voltage, and no voltage.

The power source 54 may be a direct-current power source such as button cell and solar cell. The power source 54 is capable of applying a voltage of plus or minus several volts to between the first electrode and the second electrode.

For example, as a positive voltage is applied to between the first electrode and the second electrode, the two electrochromic light control devices 51 develop a predetermined color. As a negative voltage is applied to between the first electrode and the second electrode, the two electrochromic light control devices 51 discharge color and become transparent.

Depending on the type of material included in the electrochromic layer, the two electrochromic light control devices 51 develop color when a negative voltage is applied to between the first electrode and the second electrode, and discharge color and become transparent when a positive voltage is applied thereto. Once color is developed, the developed color remains without continuously applying a voltage between the first electrode and the second electrode.

EXAMPLES

Further understanding of the present disclosure can be obtained by reference to certain specific examples provided herein below for the purpose of illustration only and are not intended to be limiting.

Example 1

Preparation of Electrochromic Device

Example 1 is for preparing the electrochromic device 10 illustrated in FIGS. 1A to 1C. The electrochromic device 10 prepared in Example 1 can be used as a light control lens device.

Formation of First Electrode Layer and Electrochromic Layer

An elliptical substrate having a maximum major-axis length of 80 mm, a maximum minor-axis length of 55 mm, and a thickness of 0.5 mm made of a polycarbonate resin (Iupilon® NF2000 available from Mitsubishi Engineering-Plastics Corporation) was prepared as the first substrate 11.

On the first substrate 11, an ITO film having a thickness of about 100 nm was formed by sputtering, thus forming the first electrode layer 12.

Next, a titanium oxide nano particle dispersion liquid (SP210 available from Showa Titanium Co., Ltd., having an average particle diameter of about 20 nm) was applied onto the ITO film by spin coating and subjected to an annealing treatment at 120° C. for 15 minutes. Thus, a nanostructural semiconductive material made of a titanium oxide particle film having a thickness of about 1.0 μm was formed.

Next, a 1.5% by mass 2,2,3,3-tetrafluoropropanol solution of an electrochromic compound having the following formula (A) was applied onto the nanostructural semiconductive material by spin coating and subjected to an annealing treatment at 120° C. for 10 minutes, to allow the titanium oxide particle film to carry (adsorb) the electrochromic compound. Thus, the electrochromic layer 13 was formed.

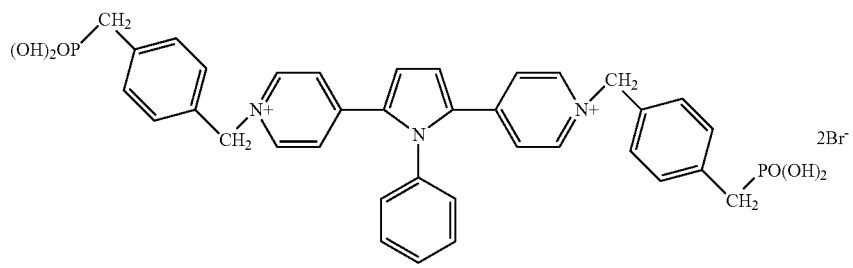

Formula (A)

Next, a dispersion liquid of $SiO_2$ fine particles having an average primary particle diameter of 20 nm (containing 24.8% by mass of solid contents of silica, 1.2% by mass of polyvinyl alcohol, and 74% by mass of water) was applied onto the electrochromic layer 13 by spin coating. Thus, an insulating inorganic particle layer having a thickness of 2 μm was formed.

Formation of Second Electrode Layer

A polycarbonate resin substrate having the same shape and thickness as that used as the first substrate 11 was prepared as the second substrate 16.

On the second substrate 16, an ITO film having a thickness of about 100 nm was formed by sputtering, thus forming the second electrode layer 15.

Next, a mixed solution of 100 parts by mass of polyethylene diacrylate (PEG400DA available from Nippon Kayaku Co., Ltd.), 5 parts by mass of a photopolymerization initiator (IRG184 available from BASF), and 40 parts by mass of an electrolyte (1-ethyl-3-methylimidazolium salt) was applied onto the surface of the insulating inorganic particle layer formed on the first substrate 11, and the surface of the second electrode layer 15 on the second substrate 16 was adhered thereto. The applied mixed solution was irradiated with ultraviolet rays to cure to form the electrolyte layer 14. Thus, a laminated body was prepared.

Formation of Protective Layer

An ultraviolet curable adhesive (KARAYAD R604 available from Nippon Kayaku Co., Ltd.) was dropped on the side surfaces of the laminated body and irradiated with ultraviolet rays to cure, thus forming the protective layer 17 having a thickness of 3 μm.

Thus, the electrochromic device 10 illustrated in FIG. 1A, not yet being thermoformed, was prepared.

Three-Dimensional Thermoforming

The above-prepared electrochromic device 10 was thermoformed by being sandwiched by convex and concave molds each having a curvature of about 130 mm while being heated to 135° C. As a result, the electrochromic device 10 had a three-dimensional spherical surface shape as illustrated in FIG. 1B.

After the thermoforming, the maximum major-axis length of the curved substrate of the electrochromic device became 81 mm. The ratio of the maximum major-axis length of the curved substrate after the thermoforming to that of the planar substrate before the thermoforming was calculated as follows: (81 mm/80 mm)×100=101.3%.

Formation of Optical Lens

A polycarbonate resin (Iupilon® CLS3400 available from Mitsubishi Engineering-Plastics Corporation), as the material for an optical lens, and the above-prepared electrochromic device 10 were inserted into a mold and integrally molded into a lens shape as illustrated in FIG. 1C by injection molding.

The surface of the optical lens adhesively formed on the laminated body of the electrochromic device 10 was cut to have a desired curvature. The laminated body of the electrochromic device 10 and the optical lens were thereafter together cut to be fitted to the frame.

Color-Development and Color-Discharging

It was confirmed that the above-prepared electrochromic device developed and discharged color. More specifically, it was confirmed that the electrochromic device 10 developed magenta color derived from the electrochromic compound having the formula (A), when one end part of each of the first substrate 11 and the second substrate 16 was detached from the first electrode layer 12 and the second electrode layer 15, respectively, to form a contact part, and a voltage of −3.5 V was applied for 3 seconds to between the first electrode layer 12 and the second electrode layer 15 via the contact parts such that the first electrode layer 12 became the negative electrode.

Example 2

Formation of Optical Lens

The procedure in Example 1 was repeated except that the polycarbonate resin (Iupilon® CLS3400 available from Mitsubishi Engineering-Plastics Corporation) was replaced with a thiourethane resin (MR-8™ available from Mitsui Chemicals, Inc.) and that the thiourethane resin and the above-prepared electrochromic device 10 were inserted into a mold and integrally molded into a lens shape by cast polymerization under heat in place of injection molding.

The surface of the optical lens adhesively formed on the laminated body of the electrochromic device 10 was cut to have a desired curvature. The laminated body of the electrochromic device 10 and the optical lens were thereafter together cut to be fitted to the frame.

Comparative Example 1

Based on the description of the 8th embodiment in JP-2015-096879-A, an electrochromic device was formed on a surface of an optical lens (made of a thiourethane resin MR-8™ available from Mitsui Chemicals, Inc.) in place of a substrate.

Examples 3 to 20

Preparation of Electrochromic Devices

Electrochromic devices of Examples 3 to 20 were prepared according to each combination of the substrate, optical lens, and adhesive layer described in Table 2. In each electrochromic device, the optical lens was adhered to the laminated body via the adhesive layer. The adhesive layer had an average thickness of 50 μm.

Detail of the materials for the substrate, optical lens, and adhesive layer are described below. The refractive index, Abbe's number, and linear expansion coefficient thereof are presented in Table 1.

The refractive index and Abbe's numbers were measured with a multi-wavelength Abbe refractometer (DR-M2 available from ATAGO CO., LTD.).

The linear expansion coefficient was measured with a thermomechanical analysis (TMA) instrument (available from Kobelco Research Institute, Inc.).

TABLE 1

|  | Substrate | | | Optical Lens | | | Adhesive Layer | |
| --- | --- | --- | --- | --- | --- | --- | --- | --- |
|  | PC | PET | PMMA | PC | MR8 | CR39 | Adhesive (1) | Adhesive (2) |
| Refractive Index | 1.6 | 1.7 | 1.5 | 1.6 | 1.6 | 1.5 | 1.6 | 1.5 |
| Abbe's Number | 29 | 39 | 58 | 29 | 41 | 58 | — | — |
| Linear Expansion Coefficient ($\times 10^{-5}/°$ C.) | 6.6 | 1.5 | 5 | 6.6 | 6.5 | 6.5 | 6.5 | 9 |

The abbreviations in Table 1 stand for the following materials.

Substrates

PC: Polycarbonate resin (Iupilon® NF2000 available from Mitsubishi Engineering-Plastics Corporation)

PET: Polyethylene terephthalate resin (Lumirror® T60 available from Toray Industries, Inc.)

PMMA: Polymethyl methacrylate resin (ACRYPLEN™ available from Mitsubishi Rayon Co., Ltd.)

Optical Lenses

PC: Polycarbonate resin (Iupilon® CLS3400 available from Mitsubishi Engineering-Plastics Corporation)

MR8: Thiourethane resin (MR-8™ available from Mitsui Chemicals, Inc.)

CR39: Allyl diglycol carbonate resin (CR-39® available from PPG Industries, Inc.) Adhesive Layers Adhesive (1): Acrylic adhesive (NT-59UV available from Nitto Denko Corporation)

Adhesive (2): Acrylic adhesive (LOCTITE® 3195 available from Henkel Japan Ltd.)

The electrochromic devices of Examples 1 to 20 and Comparative Example 1 were subjected to the following wiping test, drop ball test, and static pressure loading test. The results are presented in Table 2.

Wiping Test

The wiping test was performed based on a method according to JIS (Japanese Industrial Standards) T7334:2011 as follows.

The surface of each electrochromic device was wiped with a load of 0.7 kgf 36,500 cycles. The test results were evaluated based on the following criteria.

A: The delamination area was 3 mm² or less and no flaw was visually observed.

B: The delamination area was 3 mm² or less and a flaw was visually observed.

C: The delamination area was in excess of 3 mm².

Those in the ranks A and B can be practically used.

Drop Ball Test

The drop ball test was performed based on FDA (Food and Drug Administration) Regulations Sec. 801.410 as follows.

A sphere having a diameter of 16 mm and a weight of 16 g was dropped on each electrochromic device from the height of 127 cm. The test results were evaluated based on the following criteria.

A: No crack, delamination, or substrate damage occurred.

B: Crack or delamination was visually observed.

C: Substrate damage occurred.

Those in the ranks A and B can be practically used.

Static Pressure Loading Test

The static pressure loading test was performed based on JIS Specifications T7331:2006 and ISO 14889:2003 as follows.

A sphere having a diameter of 22 mm was pressed against each electrochromic device with a force of 100 N for 10 seconds. The test results were evaluated based on the following criteria.

A: Neither flaw nor deformation was visually observed.

B: Crack, delamination, or deformation was visually observed but no substrate damage occurred.

C: Substrate damage occurred.

Those in the ranks A and B can be practically used.

TABLE 2

| | | | | Evaluation Items | | |
|---|---|---|---|---|---|---|
| | Substrate | Optical Lens | Adhesive Layer | Wiping Test | Drop Ball Test | Static Pressure Loading Test |
| Example 1 | PC | PC | — | A | A | A |
| Example 2 | PC | MR8 | — | A | A | A |
| Comparative Example 1 | — | MR8 | — | C | C | C |
| Example 3 | PC | PC | (1) | A | A | A |
| Example 4 | | | (2) | A | A | A |
| Example 5 | | MR8 | (1) | A | A | A |
| Example 6 | | | (2) | A | A | A |
| Example 7 | | CR39 | (1) | A | A | A |
| Example 8 | | | (2) | A | A | A |
| Example 9 | PET | PC | (1) | A | A | A |
| Example 10 | | | (2) | A | A | A |
| Example 11 | | MR8 | (1) | A | A | A |
| Example 12 | | | (2) | A | A | A |
| Example 13 | | CR39 | (1) | A | A | A |
| Example 14 | | | (2) | A | A | A |
| Example 15 | PMMA | PC | (1) | A | B | B |
| Example 16 | | | (2) | A | B | B |
| Example 17 | | MR8 | (1) | A | B | B |
| Example 18 | | | (2) | A | B | B |
| Example 19 | | CR39 | (1) | A | B | B |
| Example 20 | | | (2) | A | B | B |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrochromic device comprising:
   a laminated body having a curved surface shape, including:
   a substrate;
   a first electrode layer on the substrate;
   an electrochromic layer in contact with the first electrode layer;
   a second electrode layer facing the first electrode layer;
   a solid electrolyte layer between the first electrode layer and the second electrode layer and in contact with electrochromic layer; and
   an optical lens on a first surface of the laminated body,
   wherein the substrate comprises at least one selected from the group consisting of polycarbonate resin, polyethylene terephthalate resin, polymethyl methacrylate resin, urethane resin, polyolefin resin, and polyvinyl alcohol resin.

2. The electrochromic device of claim 1, wherein the substrate forms a second surface of the laminated body opposite the first surface.

3. The electrochromic device of claim 1, further comprising an adhesive layer adhering the laminated body and the optical lens to each other.

4. The electrochromic device of claim 1, wherein the substrate and the optical lens each comprise a resin resistant to at least one of a wiping test, a drop ball test, and a static pressure loading test.

5. The electrochromic device of claim 1, wherein the optical lens comprises at least one selected from the group consisting of polycarbonate resin, allyl diglycol carbonate resin, diallyl carbonate resin, diallyl phthalate resin, urethane resin, thiourethane resin, episulfide resin, acrylate resin, methacrylate resin, and cycloolefin resin.

6. A method for manufacturing an electrochromic device of claim 1, comprising:
   successively laminating the first electrode layer and the electrochromic layer on the substrate, which is a first substrate;
   forming the second electrode layer on a second substrate;
   forming and hardening the electrolyte layer between the first substrate and the second substrate;
   sealing an outer peripheral part of the laminated body with a protective layer;
   thermoforming the laminated body to give the laminated body the curved surface shape; and
   adhering the optical lens to the laminated body.

7. The method of claim 6, wherein, in the thermoforming, the laminated body is heated to a temperature equal to or higher than a softening point of a material comprising the substrate.

8. An electrochromic light control device comprising:
   the electrochromic device of claim 1; and
   a control element.

9. The method of claim 6, comprising contacting a transparent material with the first surface of the laminated body, wherein the optical lens is adhesively formed on the laminated body by melting and hardening the transparent material, or curing the transparent material by light or heat, while the transparent material is contacting the first surface of the laminated body.

10. The method of claim 6, wherein the electrochromic device is formed by dipping the laminated body in a transparent material in a melted state and thereafter hardening the transparent material by cooling or curing by light or heat.

11. The electrochromic light control device of claim 8, wherein the control element is a switch.

12. An electrochromic device comprising:
a laminated body having a curved surface shape, including:
a substrate;
a first electrode layer on the substrate;
an electrochromic layer in contact with the first electrode layer;
a second electrode layer facing the first electrode layer;
a solid electrolyte layer between the first electrode layer and the second electrode layer and in contact with electrochromic layer; and
an optical lens on a first surface of the laminated body, wherein the substrate and the optical lens each comprise a resin resistant to at least one of a wiping test, a drop ball test, and a static pressure loading test.

\* \* \* \* \*